(12) United States Patent
Smith

(10) Patent No.: US 10,091,132 B2
(45) Date of Patent: Oct. 2, 2018

(54) SYSTEMS AND METHODS FOR RESOURCE CONTENTION RESOLUTION

(71) Applicant: Raytheon Company, Waltham, MA (US)

(72) Inventor: Keith C. Smith, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 301 days.

(21) Appl. No.: 15/010,360

(22) Filed: Jan. 29, 2016

(65) Prior Publication Data

US 2017/0222949 A1    Aug. 3, 2017

(51) Int. Cl.
*H04L 12/927* (2013.01)
*H04L 12/24* (2006.01)

(52) U.S. Cl.
CPC ............ *H04L 47/805* (2013.01); *H04L 41/06* (2013.01)

(58) Field of Classification Search
CPC .............................. H04L 47/805; H04L 41/06
See application file for complete search history.

(56) References Cited

U.S. PATENT DOCUMENTS

| | | | | |
|---|---|---|---|---|
| 5,931,924 A * | 8/1999 | Arimilli | ................ | G06F 13/364 710/116 |
| 6,026,459 A * | 2/2000 | Huppenthal | ............ | G06F 13/18 710/107 |
| 6,665,701 B1 * | 12/2003 | Combs | ................. | G06F 9/5011 709/200 |
| 6,778,812 B1 * | 8/2004 | Zhang | .................. | H04W 28/16 370/329 |
| 7,617,498 B1 * | 11/2009 | Lumsden | .................. | G06F 9/52 707/999.1 |
| 2004/0192321 A1 * | 9/2004 | Zhang | ................. | H04W 72/085 455/452.1 |
| 2007/0088886 A1 | 4/2007 | Conner | | |
| 2007/0183326 A1 * | 8/2007 | Igarashi | ............ | H04W 72/1221 370/230 |
| 2008/0040630 A1 * | 2/2008 | Travostino | .......... | H04L 12/5695 714/11 |

(Continued)

OTHER PUBLICATIONS

"International Application Serial No. PCT/US2017/014511, International Search Report dated Apr. 13, 2017", 3 pgs.

(Continued)

*Primary Examiner* — Jerry B Dennison
(74) *Attorney, Agent, or Firm* — Schwegman Lundberg & Woessner, P.A.

(57) ABSTRACT

Generally discussed herein are systems, devices, and methods for conflict resolution. A method can include identifying, by processing circuitry, whether a conflict exists between two or more nodes requesting access to a resource, in response to identifying a conflict exists, identifying a priority value for each of the nodes in conflict, the priority value for each of the nodes consistent with a probability distribution of possible priority values for each respective node, comparing the identified priority values to determine which priority value of the identified priority values corresponds to a highest priority value, and allocating access to the resource to the node corresponding to the determined highest priority value.

16 Claims, 8 Drawing Sheets

(56) References Cited

U.S. PATENT DOCUMENTS

| | | | |
|---|---|---|---|
| 2015/0016409 A1* | 1/2015 | Thill | H04W 72/0446 370/330 |
| 2015/0351106 A1* | 12/2015 | Wijetunge | H04W 72/1226 370/329 |
| 2016/0183278 A1* | 6/2016 | Chao | H04W 72/04 455/452.1 |
| 2016/0283270 A1* | 9/2016 | Amaral | G06F 9/5027 |
| 2017/0153923 A1* | 6/2017 | Choi | G06F 9/5027 |
| 2017/0222949 A1* | 8/2017 | Smith | H04L 47/70 |
| 2017/0303290 A1* | 10/2017 | Wu | H04W 72/10 |

OTHER PUBLICATIONS

"International Application Serial No. PCT/US2017/014511, Written Opinion dated Apr. 13, 2017", 7 pgs.

\* cited by examiner

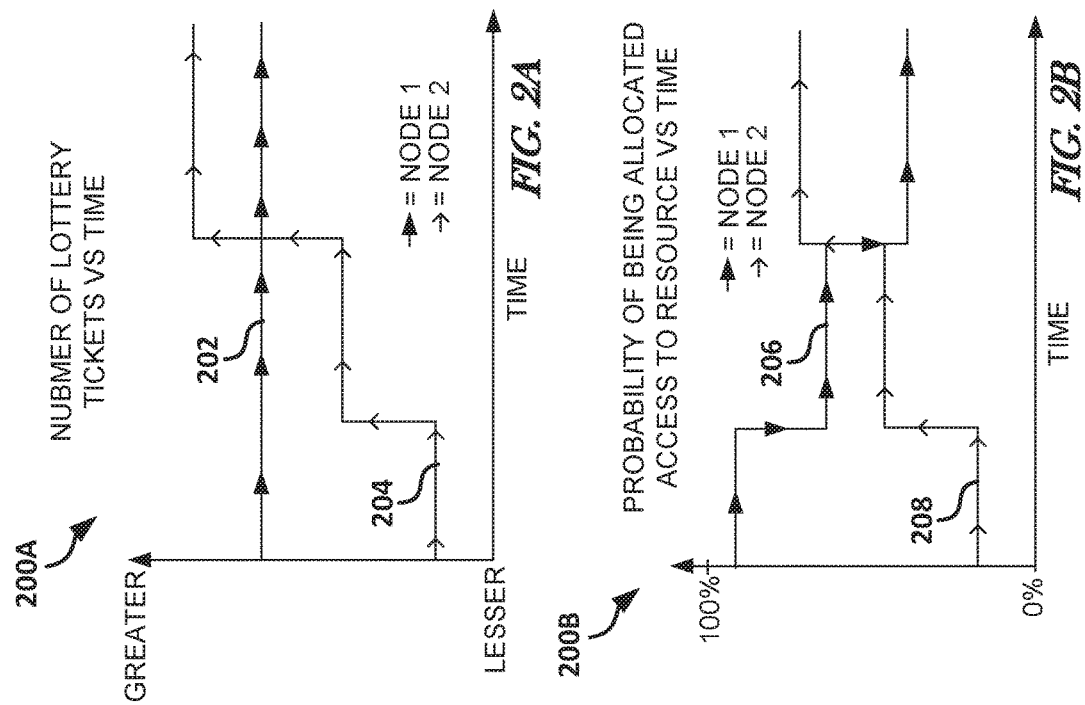
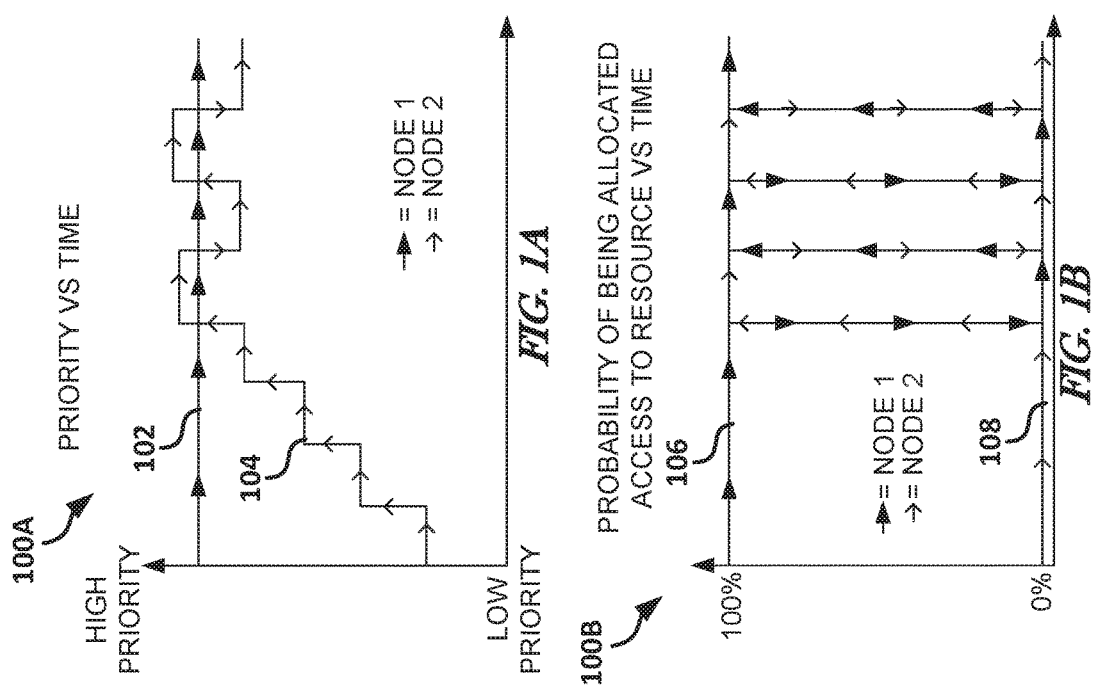

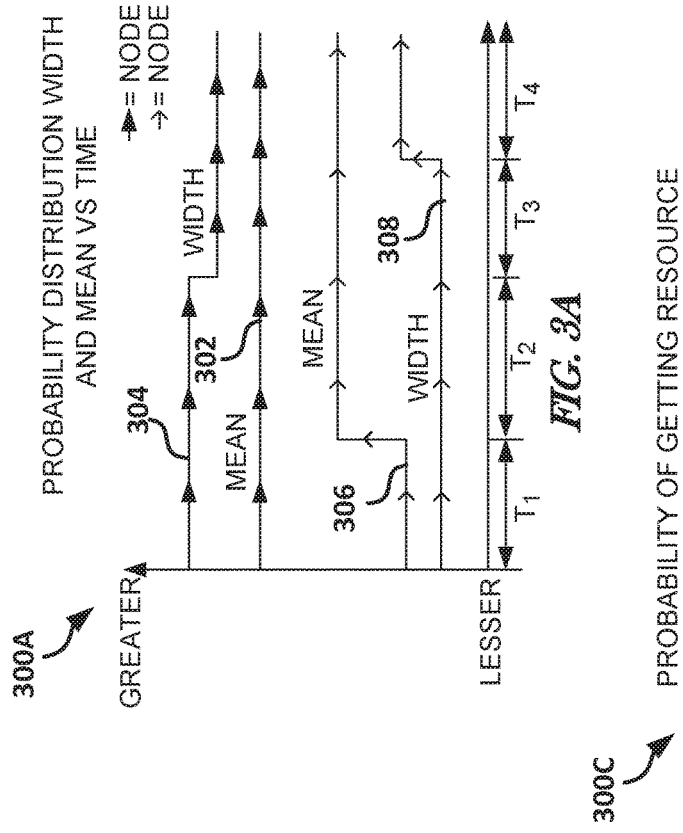

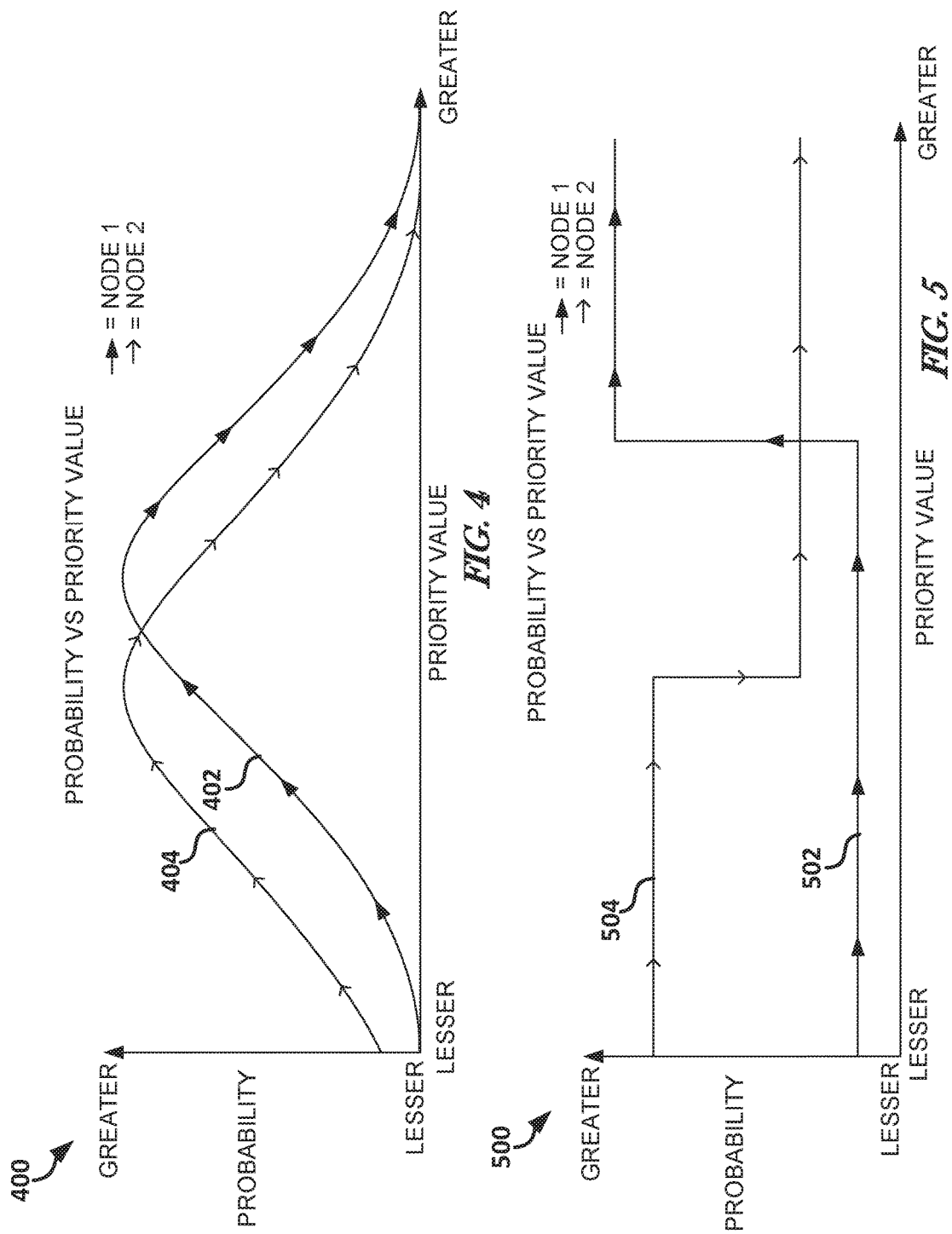

FIG. 8A (800A)

| 802 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 804 | 50 | 47 | 41 | 47 | 44 | 47 | 47 | 43 | 47 | 50 | 34 | 51 | 36 | 47 | 38 | 51 |

FIG. 8B (800B)

| 802 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 804 | 45 | 50 | 48 | 48 | 53 | 45 | 50 | 53 | 47 | 56 | 53 | 52 | 54 | 44 | 51 | 50 |

FIG. 9A (900A)

| 802 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 804 | 22 | 96 | 2 | 75 | 20 | 19 | 92 | 56 | 86 | 32 | 41 | 36 | 22 | 42 | 27 | 6 |

FIG. 9B (900B)

| 802 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 804 | 67 | 32 | 76 | 5 | 74 | 89 | 51 | 81 | 68 | 71 | 5 | 96 | 12 | 81 | 88 | 19 |

SYSTEMS AND METHODS FOR RESOURCE CONTENTION RESOLUTION

TECHNICAL FIELD

Embodiments discussed herein generally relate to determining which node(s) are allocated access to a resource. One or more embodiments regard conflict resolution in instances in which multiple node(s) desire simultaneous access or otherwise include an access conflict.

BACKGROUND

One conflict resolution procedure includes a fixed priority procedure that allocates access to a node with a higher priority. Another conflict resolution procedure includes choosing a contentious node at random. Yet another conflict resolution procedure includes a lottery procedure that allocates lottery tickets (i.e. chances to be chosen) to nodes and chooses a ticket to determine which node is allowed access to the resource. Each of these conflict resolution procedures has one or more drawbacks, such as requiring constant adjustments to provide fair load balancing creating a higher workload for a resource manager, difficulty of understanding which resource has priority, and inability for a resource to have a priority over another resource, among other drawbacks.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

FIG. 1A illustrates, by way of example, a graph of node priority value versus time in a fixed priority based contention resolution procedure.

FIG. 1B illustrates, by way of example, a graph of probability of being allocated access to a resource versus time based on the graph depicted in FIG. 1A.

FIG. 2A illustrates, by way of example, a graph of number of lottery tickets versus time in a lottery ticket based contention resolution procedure.

FIG. 2B illustrates, by way of example, a graph of probability of being allocated access to a resource versus time based on the graph depicted in FIG. 2A.

FIG. 3A illustrates, by way of example, a graph of probability distribution width and mean versus time in a uniform distribution priority band contention resolution procedure, in accord with one or more embodiments.

FIG. 3B illustrates, by way of example, a graph of possible priority values versus time in accord with the means and widths illustrated in FIG. 3A.

FIG. 3C illustrates, by way of example, a graph of probability of being allocated access to a resource versus time based on the graph depicted in FIG. 3A, in accord with one or more embodiments.

FIG. 4 illustrates, by way of example, a graph of probability vs priority value for a priority band contention resolution procedure in which the priority values are Gaussian distributed.

FIG. 5 illustrates, by way of example, a graph of probability vs priority value for a priority band contention resolution procedure in which the priority values are distributed in accord with a custom probability distribution.

FIG. 8A illustrates, by way of example, a table of priority values chosen in accord with a Gaussian distribution of priority values in accord with FIG. 4.

FIG. 8B illustrates, by way of example, a table of priority values in accord with a Gaussian distribution or priority values in accord with FIG. 4.

FIG. 9A illustrates, by way of example, a table of priority values chosen in accord with the custom distribution of priority values in accord with FIG. 5.

FIG. 9B illustrates, by way of example, a table of priority values chosen in accord with the custom distribution of priority values in accord with FIG. 5.

DETAILED DESCRIPTION

Figure 6:
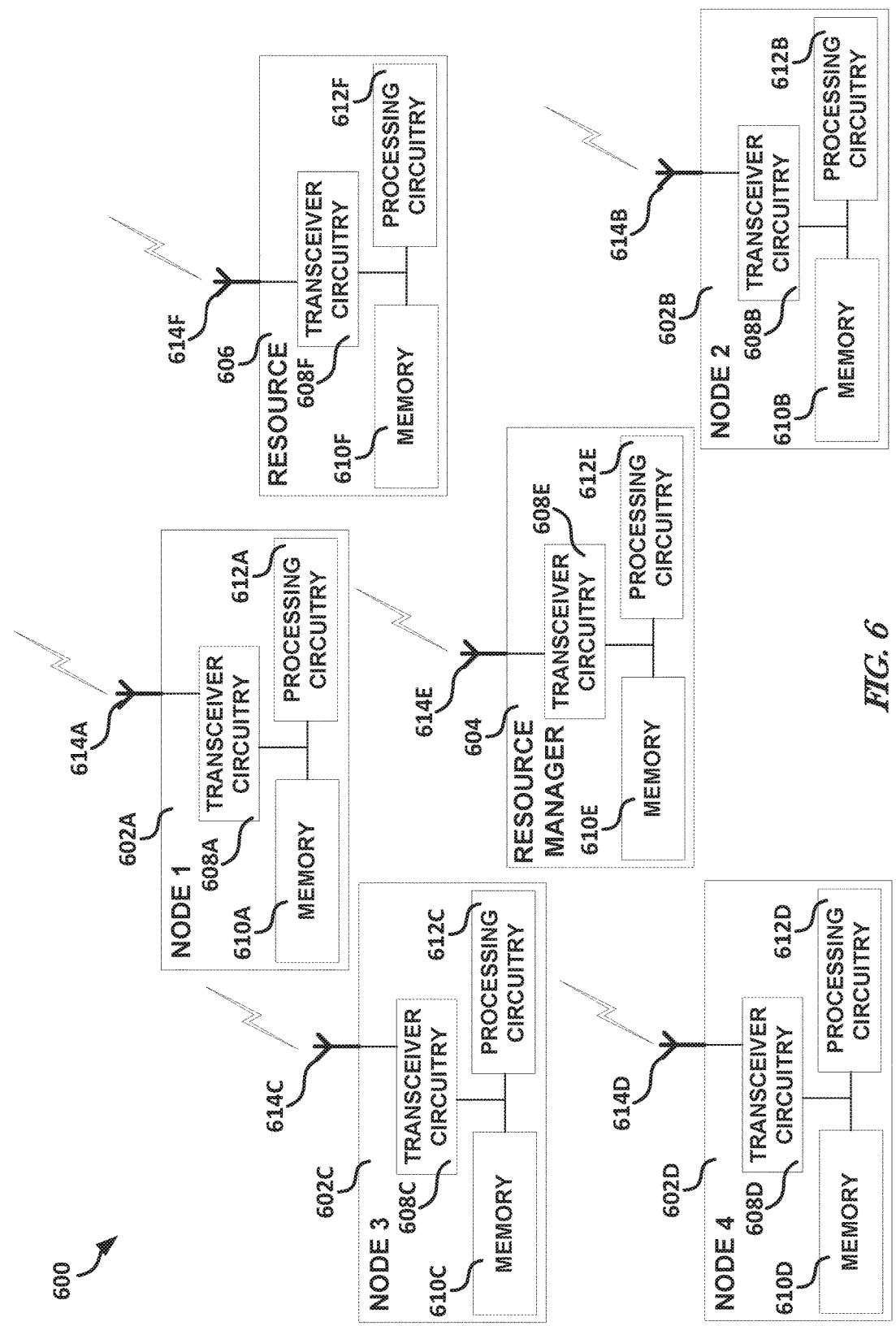
FIG. 6 illustrates, by way of example, a system for priority band based contention resolution, in accord with one or more embodiments.

Embodiments in this disclosure generally regard conflict resolution and allocating access to a resource based on the conflict resolution. In one or more embodiments, priority values are assigned to contentious nodes. The priority values are determined based on a range of possible priority values and the priority values are probabilistically distributed, such that the priority values are not static. Such a configuration allows a lower priority node a chance to access the resource even though the node is considered a lower priority node. Relative priorities of nodes can be assigned by assigning different ranges of possible priority values (i.e. widths), means, standard deviations, and/or probability distributions to different nodes. A tie breaker procedure can be performed if multiple nodes in contention are determined to be associated with the same priority value. For example, a tie breaker procedure can include identifying or determining another priority value for each of the nodes until the priority values are not the same or the first node to request the resource is allocated access to the resource.

A priority band distribution of probability values can be used to resolve a conflict between nodes in contending for access to a resource. Embodiments discussed herein can be applicable to a system, or system of systems, which has multiple asynchronous processes (a process is an example of a "node" as that term is used herein) each of which require one or more resources to perform their respective operations. The process' use of a resource may be continuous, periodic, quasi-periodic, random or any combination thereof including variation over time. The resources are limited so that resource contention between one or more processes occurs when two or more processes need to use the same resource at the same time. A process can be a behavior of a system, or system of systems. A resource can be anything that a process needs to perform its behavior.

One such asynchronous, real-time, system is a real time electronic warfare system where jamming applications are competing for signal processor, frequency converter, RF switch, and antennas, among other resources. The jamming applications synchronize their response to an assigned incoming threat (like a cruise missile). A priority band probability distribution of probability values can be assigned to each jamming application (an example of a node). In case of a contention, a priority value can be determined for each node in contention, a tie breaker procedure can be performed if the priority values tie, and a jamming application can be allocated access to the desired resource if it wins the contention resolution procedure.

FIG. 1A illustrates, by way of example, a graph 100A of node priority value versus time in a fixed priority based resource allocation procedure. In the context of FIG. 1A. "fixed" means fixed for a given time period, such as a communication frame. Line 102 corresponds to a priority value of a first node and line 104 corresponds to a priority value of a second node. In such a fixed priority scheme, a control device, such as a resource manager, can adjust the relative priority values of the nodes to achieve a specified load balance between the nodes. The control device can adjust priority values either up or down to allow a node access to a resource.

FIG. 1B illustrates, by way of example, a graph 100B of probability of being allocated access to a resource versus time based on the graph depicted in FIG. 1A. Line 106 corresponds to a probability that the first node is allocated access to the resource and line 108 corresponds to a probability that the second node is allocated access to the resource. A fixed priority procedure results in the node with the highest priority value being guaranteed access to the resource in a given frame, as can be seen in FIG. 1B. Thus, in a fixed priority value system, the probability that the node is allocated access is either one hundred percent (100%) or zero percent (0%).

FIG. 2A illustrates, by way of example, a graph 200A of number of lottery tickets versus time in a lottery ticket based resource allocation procedure. Line 202 corresponds to a number of lottery tickets held by a first node and line 204 corresponds to a number of lottery tickets held by a second node. Each lottery ticket represents an opportunity for being allocated access to the resource. A control device (e.g., a resource manager or the nodes depending on whether the conflict resolution system is centralized or distributed) selects a lottery ticket of all lottery tickets currently allocated to the nodes. The node associated with the selected lottery ticket is then allocated access to the resource.

Consider an example in which both nodes have the same number of lottery tickets. In such an example, each of the nodes has an equal chance of accessing the resource (a load balance of 50%). However, if one node holds more lottery tickets than another node, the node that holds more lottery tickets has a better chance of accessing the resource than the node that holds fewer lottery tickets.

FIG. 2B illustrates, by way of example, a graph 200B of probability of being allocated access to a resource versus time based on the graph depicted in FIG. 2A. Line 206 corresponds to a probability that the first node is allocated access to the resource and line 208 corresponds to a probability that the second node is allocated access to the resource. As previously discussed, a lottery ticket based priority procedure results in the node with the most lottery tickets having a best chance (a higher probability relative to the other nodes) of being allocated access to the resource, as can be seen in FIG. 2B. However, as long as multiple nodes hold one or more lottery tickets, there is a chance that a node with fewer lottery tickets will have one of their lottery tickets chosen and be allocated access to the resource over a node with more lottery tickets.

The lottery ticket procedure is more complicated than the fixed priority value procedure as described with regard to FIGS. 1A and 1B. This is at least because as long as multiple nodes hold lottery tickets, there is no guarantee that a given node will be allocated access to the resource. Also, the probability that a given node, in a lottery ticket procedure, is allocated access to the resource can be any value between (and including) zero and one hundred percent. However, load balancing in a lottery ticket procedure is easier than in a fixed priority procedure. Consider an example in which it is desired to have the first node allocated access to the resource seventy-five percent (75%) of the time and the second node allocated access to the resource twenty-five percent (25%) of the time. The control device can assign seventy-five lottery tickets to the first node and twenty-five lottery tickets to the second node. Then, by choosing the lottery tickets one-by-one or at random, the resources will be allocated according to the desired load balance over time.

FIG. 3A illustrates, by way of example, a graph 300A of probability distribution width and mean versus time in a uniform distribution priority band conflict resolution procedure, in accord with one or more embodiments. Line 302 corresponds to a mean of a probability distribution for a first node and line 304 corresponds to a width of a probability distribution of priority values for the first node. Line 306 corresponds to a mean of a probability distribution for a second node and line 308 corresponds to a width of a probability distribution of priority values for the second node. Consider a uniform probability distribution with a mean of fifty and a width (i.e. number of possible priority values in a range of possible priority values) of twenty-one. The priority values that the node can be assigned in this example is, for example [40, 60]. This example assumes priority values are integers, while the priority values may be real numbers (e.g., to a specified number of significant figures), symbols, characters, or other data capable of representing a priority value.

FIG. 3B illustrates, by way of example, a graph 300B of possible priority values versus time in accord with the means and widths illustrated in FIG. 3A. In one or more embodiments, the node that receives the highest priority in a given instance is allocated access to the resource. The relative overall priorities of nodes in a uniform priority band contention resolution procedure is determined by the mean and width of the possible priority values. Note that the uniform priority band procedure becomes a fixed priority procedure when the possible priority values of all respective nodes do not overlap or when the width of each of the priority band of all nodes set to zero and the means of all the nodes are different.

FIG. 3B illustrates how changing the mean and width affect the possible priority values in the uniform priority band procedure. An increase or decrease in the mean increases or decreases the maximum and minimum overall priority values, respectively, by shifting the entire band. An increase or decrease in the width increases or decreases the maximum and minimum overall priority values, respectively, by only changing the maximum and minimum equally about the mean priority value, as can be seen in FIG. 3B. Note that an increase in the width or mean does not necessarily increase a probability that the node is allocated access to the resource. However, in general, the higher the mean the better the chances a node will be allocated access to the resource.

FIG. 3C illustrates, by way of example, a graph 300C of probability of getting access to a resource versus time based on the graph 300A depicted in FIG. 3A, in accord with one or more embodiments. Line 310 corresponds to a probability that the first node is allocated access to the resource and line 312 corresponds to a probability that the second node is allocated access to the resource. A priority band based procedure results in the node with a highest priority value for a given resource contention being allocated access to the resource. To have two nodes have equal priority a control device can assign the same mean and width to each of the nodes. Any desired load balancing between nodes can be achieved by assigning a given width and mean. For example, to achieve a load balancing of 87.5 percent to 12.5 percent the control device can assign a same width to the first node and second and assign respective means such that the priority bands of the first and second nodes overlap by 50 percent.

Using the priority band based procedure, there is no need to adjust priorities to achieve the proper load balancing as in the fixed priority procedure. Also, the priority band based procedure does not require real-time based calculations to implement the procedure as in the lottery ticket based procedure. Thus, the priority band procedure can be easier to implement from the perspective of the control device. An advantage of the priority band procedure over that of the lottery procedure is that all of the procedure parameters are known beforehand. This is in contrast to the lottery procedure, where the winning lottery ticket is computed at the time of resource contention because the number of lottery tickets is not static. A priority band contention resolution procedure can include pre-computing a sequence of priority values for each node based on a probability distribution of priority values assigned to the respective node and use these pre-computed priority values when resource contention arises.

FIG. 4 illustrates, by way of example, a graph 400 of probability vs priority value for a priority band contention resolution procedure in which the priority values are Gaussian distributed. Line 402 corresponds to a likelihood that a corresponding priority value is selected for the first node and line 404 corresponds to a likelihood that a corresponding priority value is selected for the second node. The mean and standard deviation of a given probability distribution can be adjusted to provide proper load balancing in a given situation. Adjusting the mean moves the entire curve left or right on the graph 400 while adjusting the standard deviation adjusts a width of the "bell" of the curve as well as a probability of selecting the mean priority value. Decreasing the standard deviation makes the bell narrower and the probability of selecting the mean priority value greater, while increasing the standard deviation makes the bell wider and the probability of selecting the mean priority value lesser.

FIG. 5 illustrates, by way of example, a graph 500 of probability vs priority value for a priority band contention resolution procedure in which the priority values are distributed in accord with a custom probability distribution. FIG. 5 illustrates the generality of the probability distribution of priority values. Any probability distribution of priority values can be supported by one or more embodiments discussed herein. In the graph 500, the first node has a higher probability of being associated with a higher priority value than the second node. However, there is still a chance that the second node is associated with a greater priority value than the first node in a given resource contention.

Note that while uniform, Gaussian, and custom probability distributions are described herein, the priority band probability distribution can be a different probability distribution, such as a Bernoulli, binomial, negative binomial, beta-binomial, degenerate at $X_0$, discrete uniform (as opposed to continuous uniform), hypergeometric, Poisson binomial, Fisher's noncentral hypergeometric, Wallenius' noncentral hypergeometric distribution, or Boltzmann distribution, to name a few examples.

Figure 7:
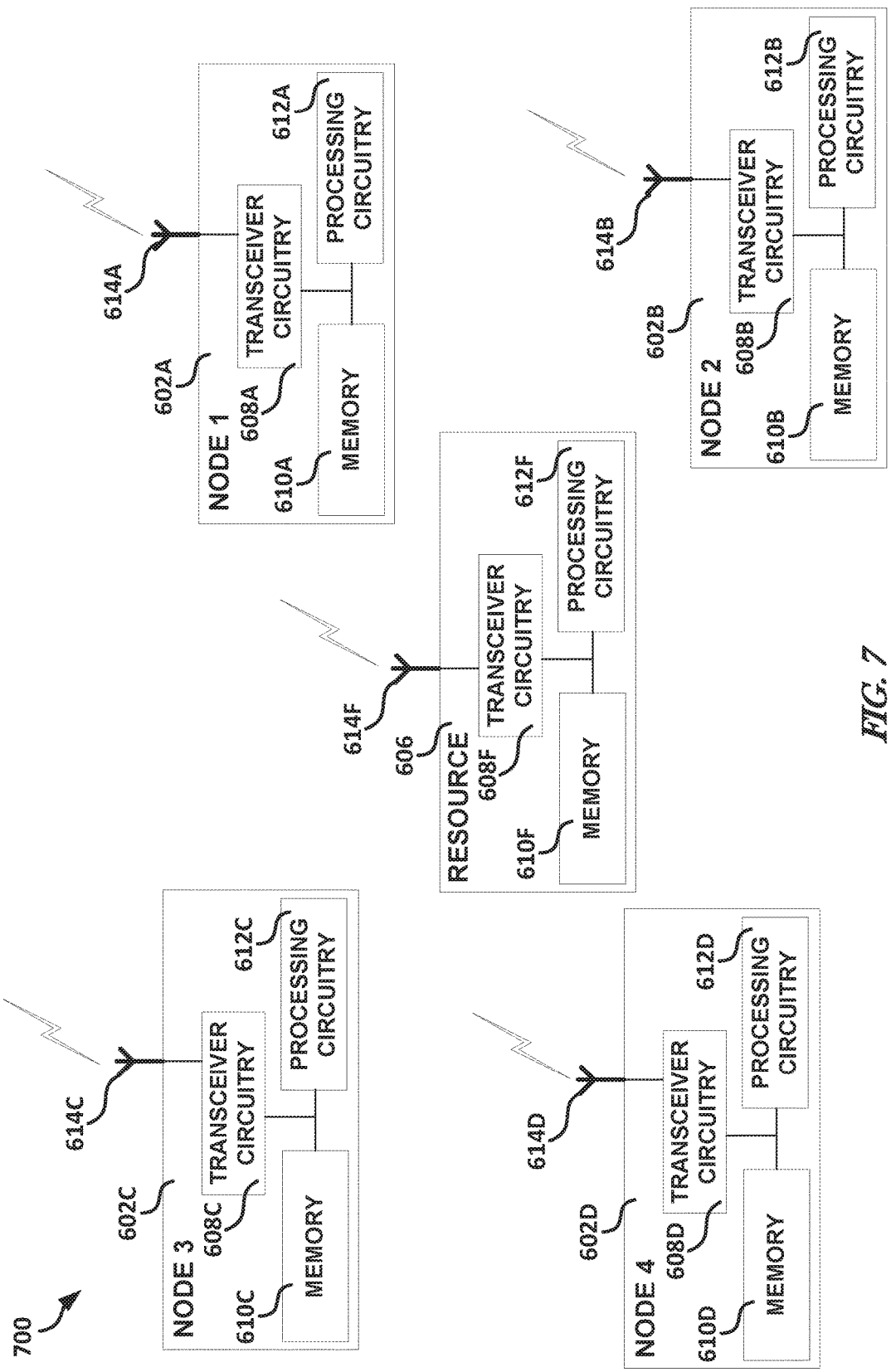
FIG. 7 illustrates, by way of example, a system for priority band based contention resolution, in accord with one or more embodiments.

FIG. 6 illustrates, by way of example, a system 600 for priority band based conflict resolution, in accord with one or more embodiments. FIG. 7 illustrates, by way of example, a system 700 for priority band based conflict resolution, in accord with one or more embodiments. The system 600 as illustrated is a centralized system that includes a resource manager 604 determining which node is allocated access in case of a conflict. In contrast, the system 700 is a distributed conflict resolution system that does not include the resource manager and instead relies on the nodes to resolve conflicts. The system 600 allows the nodes to have a simpler implementation at the expense of adding another component to the system 600, while the system 700 includes more complex nodes but the increased complexity allows the resource manager 604 to be removed from the system.

The system 600 as illustrated includes a plurality of nodes 602A, 602B, 602C, and 602D, a resource manager 604, and a resource 606. Each of the nodes 602A-D, the resource manager 604, and the resource 606 as illustrated include transceiver circuitry 608A, 608B, 608C, 608D, 608E, and 608F, memory 610A, 610B, 610C, 610D, 610E, and 610F, processing circuitry 612A, 612B, 612C, 612D, 612E, and 612F, and one or more antennas 614A, 614B, 614C, 614D, 614E, and 614F.

The transceiver circuitry 608A-F includes electric and/or electronic components to receive electromagnetic signals, modulate and demodulate electromagnetic signals to be transmitted and received, respectively, and provide the signals to the antenna 614A-F for transmission at a specific frequency or bandwidth of frequencies. The transceiver circuitry 608A-F is coupled to one or more antennas 614A-F that converts electromagnetic radiation into an electrical signal and vice versa.

The memory 610A-F may store information (e.g., data and/or instructions) for configuring the other circuitry to perform operations for configuring and transmitting signals and performing the various operations to perform one or more of the functions and/or methods described herein and/or in conjunction with FIGS. 1A-10. In one or more embodiments, the memory 610A-F includes a priority value table for each of the nodes 602A-D (see FIGS. 8A, 8B, 9A, and 9B for examples of priority value tables). In one or more embodiments, the memory 610A-F includes instructions stored thereon that, when executed by the processing circuitry 612A-F, respectively, cause the processing circuitry 612A-F to perform priority band based contention resolution operation(s).

The processing circuitry 612A-F includes electric and/or electronic components arranged to perform operations (e.g., calculations, identifications, issue commands, respond to received signals, encrypt and/or decrypt data, lookups, or the like). Electric and/or electronic components can include one or more transistors, resistors, capacitors, inductors, multiplexers, arithmetic logic units, Boolean logic gates (e.g., AND, OR, NAND, NOR, or other logic gates), inverters, combinational logic gates, state logic gates, oscillators, diodes, switches, current and/or voltage regulators, application specific integrated circuits (ASICs), Field Programmable Gate Arrays (FPGAs), power supplies, current and/or voltage supplies, amplifiers, or the like. The operations performed by the processing circuitry 612A-F can include communications associated with accessing the resource 606, determining whether a conflict for access to the resource 606 exists, resolving the conflict, and/or alerting one or more of the nodes 602A-D the results of the resolution (implicitly or expressly). The operations can be performed in response to data received from the transceiver circuitry 608A-F, and/or performed in response to executing instructions or accessing data of the memory 610A-F. The processing circuitry 612A-F can perform operations for determining which node 602A-D is allocated access to the resource 606 in case of a conflict.

The antenna 614A-F converts electromagnetic radiation into electrical signal(s) and vice versa. The antenna(s) may be uni-directional, multi-directional, or omni-directional.

In the system 600, the processing circuitry 612E performs operations for allocating access to the resource 606 and contention resolution in the event of such a conflict. In the system 600, the processing circuitry 612A-D performs functions of the nodes 602A-D, respectively and does not perform operations for contention resolution. Similarly, the processing circuitry 612F performs operations of the resource 606 and does not perform scheduling or contention resolution operations. The scheduling and contention resolution operations are allocated to the resource manager 604 in the centralized contention resolution embodiments.

The scheduling and contention resolution operations performed by the resource manager 604 can include receiving request(s) for access to the resource 606, determining if conflict exists between multiple nodes 602A-D (i.e. multiple nodes have requested access to the resource 606 at the same time), and resolving the conflict.

Resolving the conflict can be accomplished in a variety of ways. In one or more embodiments, the processing circuitry 612E determines, at random, a priority value for each of the nodes in conflict. Such a determination can include determining a priority value consistent with a probability distribution of priority values, such as is previously discussed. The probability distribution of priority values can be the same or different for two or more nodes. The determined priority values can be compared to determine which node is associated with a greater priority value for this conflict. The node determined to be associated with a greater priority value can be allocated access to the resource.

In one or more embodiments, the processing circuitry 612E, in performing a conflict resolution, identifies a priority value for each of the nodes in conflict, such as by looking up the priority value in a corresponding priority value table stored in the memory 610E. The priority values in the lookup table can include priority values consistent with a probability distribution of priority values for a respective node, see FIGS. 8A-B and 9A-B for tables of priority values consistent with a probability distribution of a respective node.

The processing circuitry 612E can choose an index 802 (see FIGS. 8A-B and 9A-B) at random or sequentially assign the priority values 804 (see FIGS. 8A-B and 9A-B) in the table to the node associated with the table. In an embodiment in which the processing circuitry 612E goes through the priority values in the table sequentially, an index identifier for each node in the system can be stored in the memory 610E. The index for a respective identifier can be incremented after each processing circuitry access in such embodiments. The index can be reset in response to reading the final priority value entry in the respective table, such as to start back over at the first entry in the table. The identified priority values can be compared to determine which node is associated with a greater priority value. The node determined to be associated with a greater priority value can be allocated access to the resource.

In one or more embodiments, a tie between determined or identified priority values can occur. There are a variety of ways to handle such a tie. In one or more embodiments, the processing circuitry 612E can determine another priority for each of the nodes in conflict until there is no longer a tie. In one or more embodiments, a set of fixed priority values that ranks each of the nodes from most important to least important is used to break the tie, such that one node always wins a tie and one node always loses a tie. In one or more embodiments, the processing circuitry 612E chooses a node of the nodes in conflict to break the tie. In one or more embodiments, the tie is broken in accord with a time that the node requested to be allocated access to the resource 606. In such embodiments, the node that first requested to be allocated access to the resource breaks the tie. Another tie-breaking procedures are possible, such as selecting the node that has had a longest amount of time elapse since it was chosen as a tiebreaker winner. In such embodiments, an entry indicating a time at which a node was selected to break a tie can be stored in the memory 610E, such as for access by the processing circuitry 612E, and the processing circuitry 612E can overwrite a corresponding entry with the time in response to selecting a node for breaking a tie.

The node allocated access to the resource can be indicated to each of the nodes in conflict, such as through a communication provided through the antenna 614E by the transceiver circuitry 608D. The communication indicating which node is allocated access can include an approval of a request for access, a denial of a request for access, and/or an indication of which node is allocated access to the resource 606 and/or which node(s) are denied access to the resource for this contention.

The processing circuitry 612E can monitor how long it has been since a node 602A-D has been allocated access to the resource 606. In one or more embodiments, if the time since the last allocation is greater than a specified threshold, the processing circuitry 612E can alter the probability distribution (e.g., a mean, range, width, standard deviation, variance, mode, support, head, tail, median, symmetry, skewness, or other variable) to increase the chances the node that has been denied access is allocated access in the next contention resolution.

The node 602A as illustrated is a device, such as can include a sensor (or other environmental monitoring device), a computer, a phone, a vehicle, an instance of a software application, independent process, or an appliance. While the resource manager 604 is illustrated as being an entity separate from the resource 606, the resource manager 604 can be a part of the resource 606 in one or more embodiments. The resource 606, as illustrated, is a device, such as can include a device that performs operations on data, information, or material received or transmitted from the nodes 602A-D and/or provides instructions to perform operations to the nodes 602A-D. The resource 606 can include a computer program, a processor, a computer, a phone, a vehicle, an appliance, a sensor, an effector, a signal processing component, a signal converter, or another device access to which is shared by the nodes 602A-D.

FIG. 7 illustrates, by way of example, a system 700 for priority band based conflict resolution, in accord with one or more embodiments. The system 700 is a distributed conflict resolution system. The items of the system 700 are similar to the items of the system 600 with some of the items of the system 700 performing more operations than in the system 600, since the system 700 does not include a resource manager 604.

To implement a conflict resolution process without the resource manager 604, the processing circuitry 612A-D and/or 612F can perform operations for the conflict resolution that are performed by the processing circuitry 602E in the system 600. In one or more embodiments, the nodes 602A-D can indicate to one another the times at which they desire access to the resource 600. The processing circuitry 612A-D can determine whether a conflict exists. In one or more embodiments, in response to determining a conflict exists, the processing circuitry 612A-D can determine a priority value (as previously discussed) for each of the nodes in conflict. The processing circuitry 612A-D can each be configured (e.g., programmed) to determine or identify the same priority value for each node, in response to determining a conflict exists, so as to keep contention resolution consistent among nodes. In this manner, each of the nodes 602A-D can independently determine which node of the conflicted nodes is allocated access to the resource 606. Such a configuration increases the computation burden of the nodes 602A-D, but allows the system to be implemented using one less entity (the resource manager node 604).

To achieve this, each of the nodes 602A-D needs to have a probability distribution of priority values, a table of pre-computed priority values, seed values for determining a random number, and/or rules regarding how to determine a priority value for each of the nodes 602A-D stored thereon. In general, the processing circuitry 612A-D performs operations as discussed with the processing circuitry 612E and the memory 610A-D includes data as discussed with regard to the memory 610E to implement a distributed priority band based conflict resolution system.

While the resource manager 604 in FIG. 6 is depicted as a separate entity from the nodes 602A-D, the resource manager 604 can be implemented using one or more of the nodes 602A-D. For example, one node 602A-D can be chosen to perform all the functionality of the resource manager 604, thus complicating the computation and operational load of only a single node and not requiring a separate device for contention resolution.

While the embodiments illustrated regard devices requesting access to other devices, the disclosed subject matter is applicable more generally to resolving conflicts in any schedule. For example, if multiple entities desire access to a facility at a same time, the conflict can be resolved using one or more techniques discussed herein. The nodes 602A-D can be replaced with people, teams, businesses, organizations, processes, or a combination thereof and the resource 606 can be replaced with a building (e.g., stadium or theater), room, device (e.g., a computer, phone, vehicle, or an appliance), an indoor or outdoor space (e.g., a field, course, picnic shelter, or a recreation area), stadium, theater, or other object and the processes can be applied without loss of generality.

FIG. 8A illustrates, by way of example, a table 800A of priority values chosen in accord with a Gaussian distribution of priority values with a mean of 45 and a standard deviation of five (5), as shown FIG. 4 line 404, and rounding the result to the nearest integer. FIG. 8B illustrates, by way of example, a table 800B of priority values in accord with a Gaussian distribution or priority values with a mean of 50 and a standard deviation of five (5), as shown in FIG. 4 line 402, and rounding the result to the nearest integer.

FIG. 9A illustrates, by way of example, a table 900A of priority values chosen in accord with the custom distribution of priority values as shown FIG. 5 line 504, and rounding the result to the nearest integer. FIG. 9B illustrates, by way of example, a table 900B of priority values chosen in accord with the custom distribution of priority values as shown FIG. 5 line 502, and rounding the result to the nearest integer.

These tables 800A-B and/or 900A-B can be stored in one or more of the memory 610A-F. The processing circuitry 612A-F can choose, either sequentially or at random, an index of priority values to compare. In one or more embodiments, the processing circuitry 612A-F determines a single index and uses the same index for each node in conflict. In one or more embodiments, the processing circuitry 612A-F determines a random index for each node individually. The processing circuitry 612A-F then compares the priority values in the determined indexes, performs tie breaker operations if there is a tie between priority values, and allocates access to the node(s) accordingly.

Alternatively, each time a conflict is detected, the processing circuitry 612A-F calculates a priority value for each of the nodes in conflict based on an associated probability distribution of priority values, performs tiebreaker operations if there is tie between priority values, and allocates access to the nodes accordingly. Such a configuration is more expensive in terms of operations performed by the processing circuitry and time it takes to resolve the conflict, but saves memory space by not requiring pre-computed table of priority values to resolve conflicts.

A probability distribution of priority values indicates, generally, how many times, on average, each possible priority value for an associated node will be selected out of a specified number of selections. For example, consider a uniform distribution of priority values [1, 2, 3, 4, 5, 6, 7, 8, 9, 10]. On average, each of the priority values will be selected 10 times over 100 selections.

Figure 10:
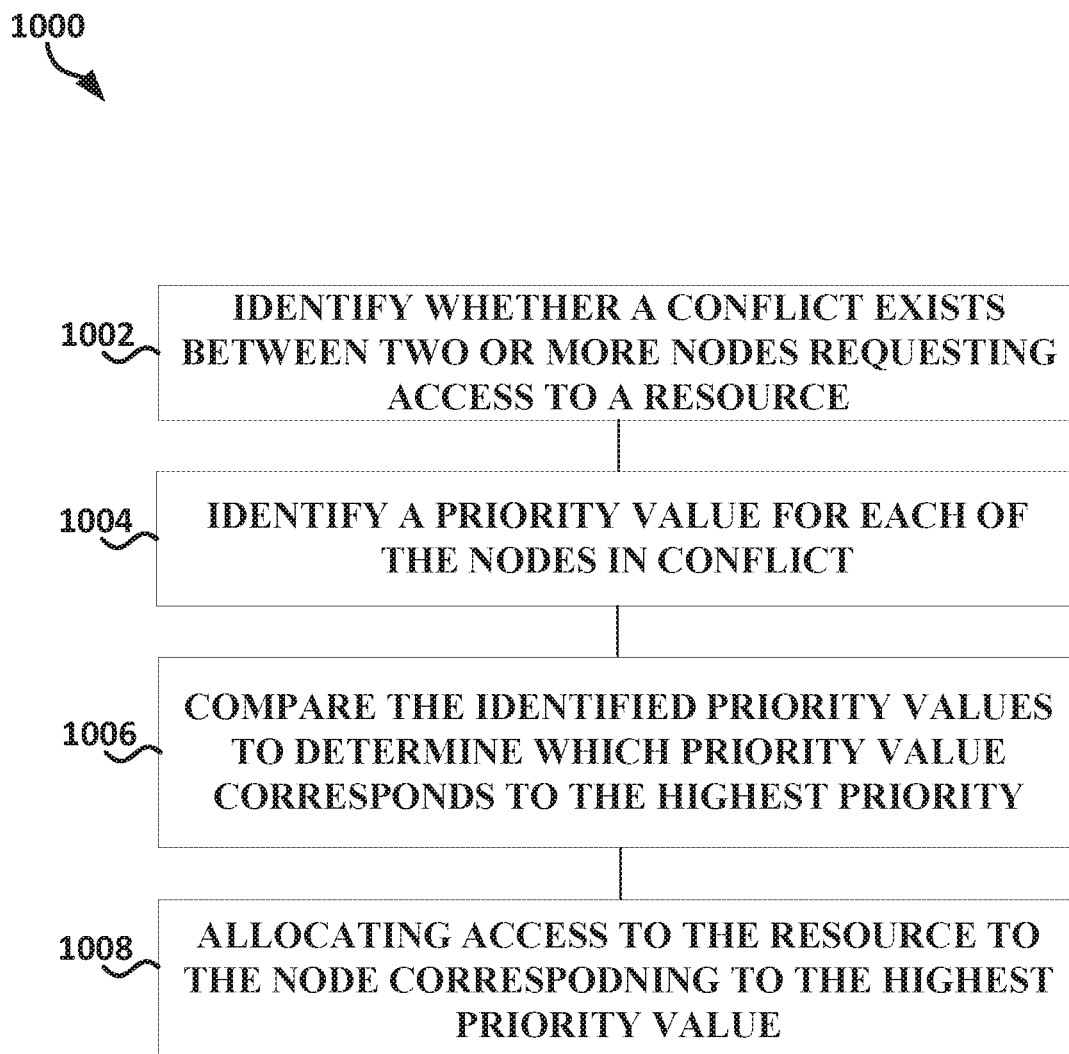
FIG. 10 illustrates, by way of example, a method for priority band based conflict resolution, in accord with one or more embodiments.

FIG. 10 illustrates, by way of example, a method 1000 for conflict priority band based conflict resolution. The method 1000 as illustrated includes: identifying, such as by processing circuitry, whether a conflict exists between two or more nodes requesting access to a resource, at operation 1002; identifying, such as in response to identifying a conflict exists, a priority value for each of the nodes in conflict, at operation 1004; comparing the identified priority values to determine which priority of the identified priorities corresponds to a highest priority value, at operation 1006; and allocating access to the resource to the node corresponding to the determined highest priority value, at operation 1008. The priority value for each of the nodes is consistent with a probability distribution of possible priority values for each respective node.

In one or more embodiments, the priority value of each of the nodes is a priority value from a range of priority values uniformly distributed about a different mean priority value. In one or more embodiments, the ranges of priority values of each of the two or more nodes only partially overlap.

In one or more embodiments, the priority value of each of the nodes is a priority value from a range of priority values distributed in accord with a Gaussian distribution with different respective means for each node. In one or more embodiments, a standard deviation of each of the Gaussian distributions for the respective nodes are different.

In one or more embodiments, the method 1000 further includes allocating access to the resource to the node corresponding to the determined highest priority. In one or more embodiments, the operation at 1004 includes calculating a random priority value from a set of priority values for each of the nodes distributed in accord with a different probability distribution for each node. In one or more embodiments, the operation at 1004 includes identifying a next priority value in a lookup table that includes priority values for respective nodes distributed in accord with a different probability distribution of priority values for the respective node.

In one or more embodiments, the method 1000 further includes determining whether the identified priority values are the same and, in response to determining the identified priority values are the same, identifying other priority values for the two or more nodes in conflict. In one or more embodiments, the method 1000 further comprises determining whether one or more of the nodes is not being allocated access to the resource and, in response to determining one or more of the nodes is not being allocated access to the resource, changing the priority values of the one or more nodes in accord with a different probability distribution so as to increase, on average, the priority values of the one or more nodes.

Figure 11:
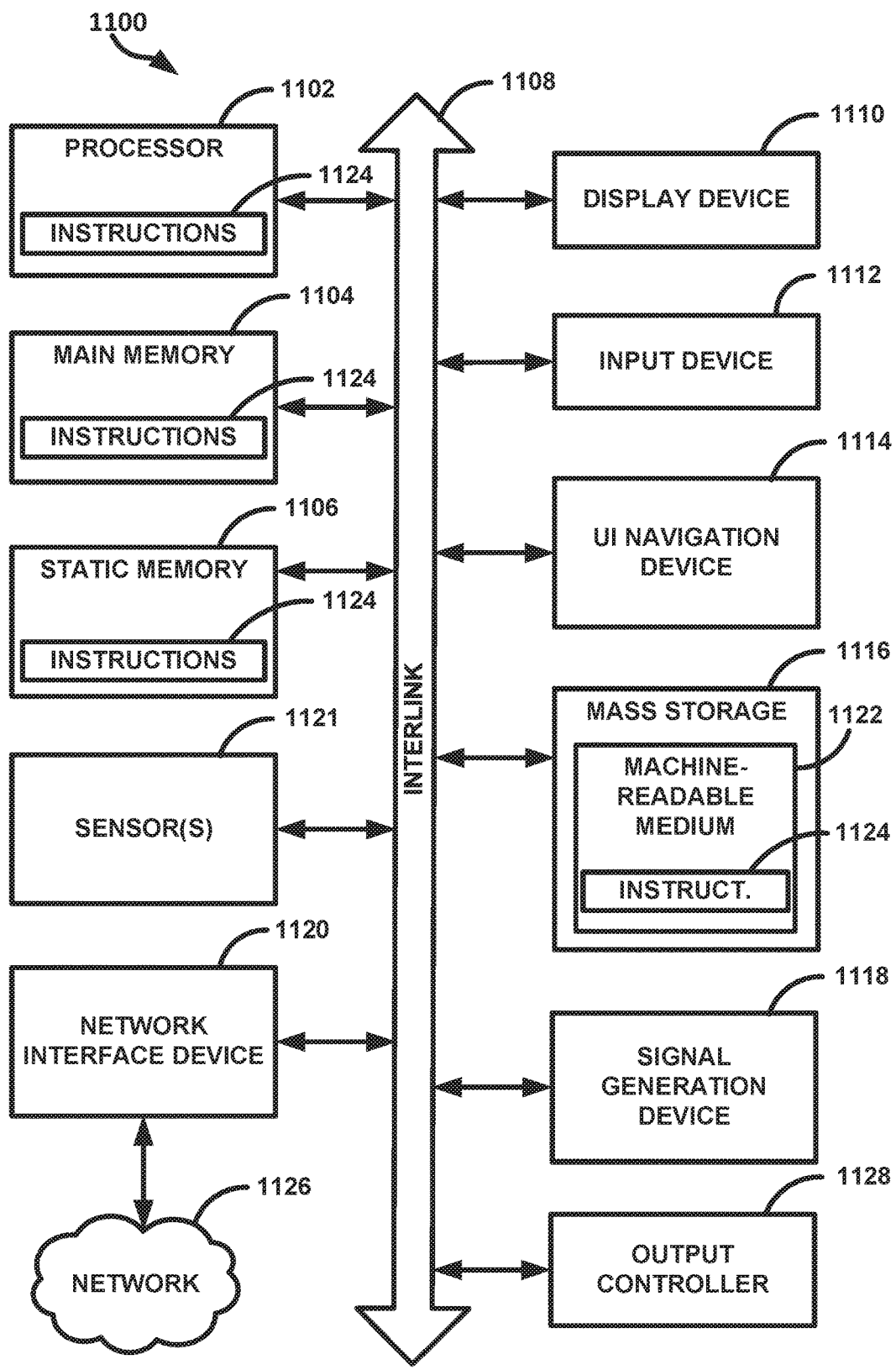
FIG. 11 illustrates, by way of example, a block diagram of an embodiment of a machine on which one or more of the methods (e.g., processes, procedures, or techniques) as discussed herein can be implemented.

FIG. 11 illustrates, by way of example, a block diagram of an embodiment of a machine 1100 on which one or more of the operations as discussed herein can be implemented. The machine 1100 can include a computing device instantiated as a compute device or server. The machine 1100 may be employed to host or be integral to hardware, software, and/or firmware that performs contention resolution. One or more of the node(s) 602A-D, the resource manager 604, the resource 606, the transceiver circuitry 610A-F, and the processing circuitry 612A-F can include one or more of the items of the machine 1100. In one or more embodiments, the node(s) 602A-D, the resource manager 604, the resource 606, the transceiver circuitry 610A-F, and the processing circuitry 612A-F can be implemented using one or more items of the machine 1100. In alternative embodiments, the machine 1100 operates as a standalone device or may be connected (e.g., networked) to other machines. In a networked deployment, the machine 1100 may operate as a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 1100 includes a processor 1102 (e.g., a central processing unit (CPU), a graphics processing unit (GPU) or both), a main memory 1104 and a static memory 1106, which communicate with each other via a bus 1108. The machine 1100 may further include a video display unit 1110 (e.g., a liquid crystal display (LCD) or a cathode ray tube (CRT)). The machine 1100 may include an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

The memory 1104 or 1106 are examples of a storage device that can include instructions stored thereon that are executed by a machine, such as a processor or other processing circuitry, and cause the machine to perform operations. The storage device can be programmed and maintained prior to its inclusion in a system. The instructions and other information can be encrypted or otherwise protected by one or more security measures, such as to help protect the operational boundaries and other data stored thereon.

The disk drive unit 1116 as illustrated includes a machine-readable medium 1122 on which is stored one or more sets of instructions and data structures (e.g., software) 1124 embodying or utilized by any one or more of the methodologies or operations described herein. The instructions 1124 may also reside, completely or at least partially, within the main memory 1104 and/or within the processor 1102 during execution thereof by the machine 1100, the main memory 1104 and the processor 1102 also including machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1124 may further be transmitted or received over a communications network 1126 using a transmission medium. The instructions 1124 may be transmitted using the network interface device 1120 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. The processing circuitry 612A-F and the transceiver circuitry 608A-F can be implemented using one or more modules. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C, C++, C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

In an example, the hardware can include configurable execution units (e.g., transistors, logic gates (e.g., combinational and/or state logic), circuits, or other electric or electronic components) and a machine readable medium containing instructions, where the instructions configure the execution units to carry out a specific operation when in operation. The configuring can occur under the direction of the executions units or a loading mechanism. Accordingly, the execution units (e.g., processing circuitry, such as can include one or more hardware processors, transistors, resistors, capacitors, inductors, state machines or other logic gates, multiplexers, radios, sensors or other electrical or electronic components) can be communicatively coupled to the machine readable medium when the device is operating. In this example, the execution units can be a user (e.g., personnel) of more than one module. For example, under operation, the execution units can be configured by a first set of instructions to implement a first module at one point in time and reconfigured by a second set of instructions to implement a second module. The modules can be implemented with the division of operations as explained herein or the division of operations can be different such that a single module implements one or more of the operations of two or more of the modules or multiple modules implement the operations of one of the modules.

Examples and Additional Notes

Example 1 can include or use subject matter (such as an apparatus, a method, a means for performing operations, or a machine readable storage device including instructions stored thereon that, when performed by the machine, can cause the machine to perform operations), such as can include or use a device for resolving which nodes requesting access to a resource are allocated access to the resource, the device comprising processing circuitry to identify whether a conflict between two or more nodes requesting access to a resource exists, in response to identification of a conflict, identify a priority value for each of the two or more nodes in the conflict, the priority value for each of the nodes consistent with a probability distribution of possible priority values for each respective node, and compare the identified priority values to determine which priority value of the identified priority values corresponds to a highest priority value, allocate access to the resource to the node with the determined highest priority value, and a transceiver coupled to the processing circuitry to indicate to the two or more nodes in the conflict which node is allocated access to the resource.

Example 2 can include or use, or can optionally be combined with the subject matter of Example 1, to include or use, wherein the priority value of each of the nodes includes a range of priority values uniformly distributed about a different mean priority value.

Example 3 can include or use, or can optionally be combined with the subject matter of Example 2, to include or use, wherein the ranges of priority values of each of the two or more nodes only partially overlap.

Example 4 can include or use, or can optionally be combined with the subject matter of Example 1, to include or use, wherein the priority value of each of the nodes includes a priority from priority values distributed in accord with a Gaussian distribution with different respective means.

Example 5 can include or use, or can optionally be combined with the subject matter of Example 4, to include or use, wherein a standard deviation of each of the Gaussian distributions are different.

Example 6 can include or use, or can optionally be combined with the subject matter of at least one of Examples 1-5, to include or use, wherein identifying a priority value for each of the nodes in conflict includes calculating a random priority value from a set of priority values for each of the nodes distributed in accord with a different probability distribution for each node.

Example 7 can include or use, or can optionally be combined with the subject matter of at least one of Examples 1-5, to include or use, wherein identifying a priority value for each of the nodes in conflict includes identifying a next priority value in a lookup table that includes priority values for respective nodes distributed in accord with a different probability distribution for the respective node.

Example 8 can include or use, or can optionally be combined with the subject matter of at least one of Example 1-7, to include or use, determine whether the identified priority values are the same and, in response to determining the identified priority values are the same, identifying other priority values for the two or more nodes in conflict.

Example 9 can include or use, or can optionally be combined with the subject matter of at least one of Example 1-8, to include or use determine whether one or more of the nodes is not being allocated access to the resource and, in response to determining one or more of the nodes is not being allocated access to the resource, changing the priority values of the one or more nodes in accord with a different probability distribution so as to increase, on average, the priority values of the one or more nodes.

Example 10 can include or use, or can optionally be combined with the subject matter of Example 9, to include or use, wherein changing the priority values of the one or more nodes includes adjusting two of a mean, range, and standard deviation of the probability distribution of priority values.

Example 11 can include or use subject matter (such as an apparatus, a method, a means for performing operations, or a machine readable storage device including instructions stored thereon that, when performed by the machine, can cause the machine to perform operations), such as can include or use identifying, by processing circuitry, whether a conflict exists between two or more nodes requesting access to a resource, in response to identifying a conflict exists, identifying a priority value for each of the nodes in conflict, the priority value for each of the nodes consistent with a probability distribution of possible priority values for each respective node, comparing the identified priority values to determine which priority value of the identified priority values corresponds to a highest priority value, and allocating access to the resource to the node corresponding to the determined highest priority value.

Example 12 can include or use, or can optionally be combined with the subject matter of Example 11, to include or use, wherein the priority value of each of the nodes includes a range of priority values uniformly distributed about a different mean priority value.

Example 13 can include or use, or can optionally be combined with the subject matter of Example 12, to include or use, wherein the ranges of priority values of each of the two or more nodes only partially overlap.

Example 14 can include or use, or can optionally be combined with the subject matter of Example 11, to include or use, wherein the priority value of each of the nodes is a priority value from priority values distributed in accord with a Gaussian distribution with different respective means.

Example 15 can include or use, or can optionally be combined with the subject matter of Example 14, to include or use, wherein a standard deviation of each of the Gaussian distributions are different.

Example 16 can include or use subject matter (such as an apparatus, a method, a means for performing operations, or a machine readable storage device including instructions stored thereon that, when performed by the machine, can cause the machine to perform operations), such as can include or use identifying, by processing circuitry, whether a conflict exists between two or more nodes requesting access to a resource, in response to identifying a conflict exists, identifying a priority value for each of the nodes in conflict, the priority value for each of the nodes consistent with a probability distribution of possible priority values for each respective node, comparing the identified priority values to determine which priority value of the identified priorities corresponds to a highest priority value, and allocating access to the resource to the node corresponding to the determined highest priority value.

Example 17 can include or use, or can optionally be combined with the subject matter of Example 16, to include or use, wherein the instructions for identifying a priority value for each of the nodes in conflict include instructions for calculating a random priority value from a set of priority values for each of the nodes distributed in accord with a different probability distribution for each node.

Example 18 can include or use, or can optionally be combined with the subject matter of at least one of Examples 16-17, to include or use, wherein the instructions for identifying a priority value for each of the nodes in conflict include instructions for identifying a next priority value in a lookup table that includes priority values for respective nodes distributed in accord with a different probability distribution for the respective node.

Example 19 can include or use, or can optionally be combined with the subject matter of at least one of Examples 16-18, to include or use instructions which, when executed by the machine, cause the machine to perform further operations comprising determining whether the identified priority values are the same and, in response to determining the identified priority values are the same, identifying other priority values for the two or more nodes in conflict.

Example 20 can include or use, or can optionally be combined with the subject matter of at least one of Examples 16-19, to include or use instructions which, when executed by the machine, cause the machine to perform further operations comprising determining whether one or more of the nodes is not being allocated access to the resource and, in response to determining one or more of the nodes is not being allocated access to the resource, changing the priority values of the one or more nodes in accord with a different probability distribution so as to increase, on average, the priority values of the one or more nodes.

As used herein, a "-" (dash) used when referring to a reference number means "or", in the non-exclusive sense of all elements within the range indicated by the dash. For example, 103A-B means a nonexclusive or of the elements in the range {103A, 103B}, such that 103A-103B includes "103A but not 103B", "103B but not 103A", and "103A and 103B".

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device for resolving which nodes requesting access to a resource are allocated access to the resource, the device comprising:
    processing circuitry to:
    identify whether a conflict between two or more nodes requesting access to a resource exists;
    in response to identification of a conflict, assigning a priority value for each of the two or more nodes in the conflict, the priority value for each of the nodes distributed in accord with a time independent probability distribution of possible priority values for each respective node, the probability distribution of possible priority values including priority values and a respective likelihood that the node is assigned the priority value for each priority value in the distribution,
    wherein assigning the priority value for each of the nodes in conflict includes one of (1) calculating a random priority value from a set of priority values for each of the nodes distributed in accord with a different probability distribution for each node and (2) assigning a next priority value in a lookup table that includes priority values for respective nodes distributed in accord with the different probability distribution for the respective node;
    compare the identified priority values to determine which priority value of the identified priority values corresponds to a highest priority value;
    allocate access to the resource to the node with the determined highest priority value; and
    a transceiver coupled to the processing circuitry to indicate to the two or more nodes in the conflict which node is allocated access to the resource.

2. The device of claim 1, wherein the priority value of each of the nodes includes a range of priority values uniformly distributed about a different mean priority value.

3. The device of claim 2, wherein the ranges of priority values of each of the two or more nodes only partially overlap.

4. The device of claim 1, wherein the priority value of each of the nodes includes a priority from priority values distributed in accord with a Gaussian distribution with different respective means.

5. The device of claim 4, wherein a standard deviation of each of the Gaussian distributions are different.

6. The device of claim 1, further comprising the processing circuitry further configured to determine whether the identified priority values are the same and, in response to determining the identified priority values are the same, identifying other priority values for the two or more nodes in conflict.

7. The device of claim 1, further comprising the processing circuitry further configured to determine whether one or more of the nodes is not being allocated access to the resource and, in response to determining one or more of the nodes is not being allocated access to the resource, changing the priority values of the one or more nodes in accord with a different probability distribution so as to increase, on average, the priority values of the one or more nodes.

8. The device of claim 7, wherein changing the priority values of the one or more nodes includes adjusting two of a mean, range, and standard deviation of the probability distribution.

9. A method for resolving which nodes requesting access to a resource are allocated access to the resource comprising:
    identifying, by processing circuitry, whether a conflict exists between two or more nodes requesting access to a resource;
    in response to identifying a conflict exists, assigning a priority value for each of the nodes in conflict, the priority value for each of the nodes distributed in accord with a time independent probability distribution of possible priority values for each respective node, the probability distribution of possible priority values including priority values and a respective likelihood that the node is assigned the priority value for each priority value in the distribution,
    wherein assigning the priority value for each of the nodes in conflict includes one of (1) calculating a random priority value from a set of priority values for each of the nodes distributed in accord with a different probability distribution for each node and (2) assigning a next priority value in a lookup table that includes priority values for respective nodes distributed in accord with the different probability distribution for the respective node;
    comparing the identified priority values to determine which priority value of the identified priority values corresponds to a highest priority value; and
    allocating access to the resource to the node corresponding to the determined highest priority value.

10. The method of claim 9, wherein the priority value of each of the nodes includes a range of priority values uniformly distributed about a different mean priority value.

11. The method of claim 10, wherein the ranges of priority values of each of the two or more nodes only partially overlap.

12. The method of claim 9, wherein the priority value of each of the nodes is a priority value from priority values distributed in accord with a Gaussian distribution with different respective means.

13. The method of claim 12, wherein a standard deviation of each of the Gaussian distributions are different.

14. A non-transitory machine-readable storage device including instructions stored thereon which, when executed by the machine, cause the machine to perform operations for resolving which nodes requesting access to a resource are allocated access to the resource, the operations comprising:

identifying, by processing circuitry, whether a conflict exists between two or more nodes requesting access to a resource;

in response to identifying a conflict exists, assigning a priority value for each of the nodes in conflict, the priority value for each of the nodes distributed in accord with a time independent probability distribution of possible priority values for each respective node, the probability distribution of possible priority values including priority values and a respective likelihood that the node is assigned the priority value for each priority value in the distribution, wherein assigning the priority value for each of the nodes in conflict includes one of (1) calculating a random priority value from a set of priority values for each of the nodes distributed in accord with a different probability distribution for each node and (2) assigning a next priority value in a lookup table that includes priority values for respective nodes distributed in accord with the different probability distribution for the respective node;

comparing the identified priority values to determine which priority value of the identified priorities corresponds to a highest priority value; and allocating access to the resource to the node corresponding to the determined highest priority value.

15. The storage device of claim 14, further comprising the processing circuitry further configured to determine whether the identified priority values are the same and, in response to determining the identified priority values are the same, identifying other priority values for the two or more nodes in conflict.

16. The storage device of claim 14, further comprising instructions which, when executed by the machine, cause the machine to perform further operations comprising determining whether one or more of the nodes is not being allocated access to the resource and, in response to determining one or more of the nodes is not being allocated access to the resource, changing the probability distribution of priority values of the one or more nodes in accord with a different probability distribution so as to increase, on average, the priority values of the one or more nodes.

* * * * *

UNITED STATES PATENT AND TRADEMARK OFFICE
CERTIFICATE OF CORRECTION

PATENT NO. : 10,091,132 B2  
APPLICATION NO. : 15/010360  
DATED : October 2, 2018  
INVENTOR(S) : Keith C. Smith It is certified that error appears in the above-identified patent and that said Letters Patent is hereby corrected as shown below:

In the Specification

In Column 2, Line 67, delete "converter." and insert --converter,-- therefor

In Column 3, Line 13, delete "1A." and insert --1A,-- therefor

In Column 6, Line 6, delete "hypergeometric." and insert --hypergeometric,-- therefor In Column 9, Line 7, delete "602E" and insert --612E-- therefor In Column 9, Line 10, delete "600." and insert --606.-- therefor In Column 11, Line 26, delete "610A-F," and insert --608A-F,-- therefor In Column 11, Line 30, delete "610A-F," and insert --608A-F,-- therefor In Column 13, Line 62, delete "herein." and insert --herein,-- therefor Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*